(12) United States Patent
Warkentin et al.

(10) Patent No.: US 11,561,894 B2
(45) Date of Patent: Jan. 24, 2023

(54) ENABLING EFFICIENT GUEST ACCESS TO PERIPHERAL COMPONENT INTERCONNECT EXPRESS (PCIE) CONFIGURATION SPACE

(71) Applicant: VMware, Inc., Palo Alto, CA (US)

(72) Inventors: Andrei Warkentin, Chicago, IL (US); Alexander Fainkichen, Boston, MA (US); Ye Li, Boston, MA (US); Regis Duchesne, Monts-de-Corsier (CH); Cyprien Laplace, Boston, MA (US); Shruthi Hiriyuru, Boston, MA (US); Sunil Kotian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 78 days.

(21) Appl. No.: 17/142,980

(22) Filed: Jan. 6, 2021

(65) Prior Publication Data
US 2022/0214968 A1 Jul. 7, 2022

(51) Int. Cl.
*G06F 12/06* (2006.01)
*G06F 9/455* (2018.01)
*G06F 13/16* (2006.01)
*G06F 13/42* (2006.01)

(52) U.S. Cl.
CPC ...... *G06F 12/0646* (2013.01); *G06F 9/45558* (2013.01); *G06F 13/1668* (2013.01); *G06F 13/4282* (2013.01); *G06F 2009/45583* (2013.01); *G06F 2212/1044* (2013.01); *G06F 2213/0026* (2013.01)

(58) Field of Classification Search
CPC ............. G06F 12/0646; G06F 9/45558; G06F 13/1668; G06F 13/4282; G06F 2009/45583; G06F 2212/1044; G06F 2213/0026
See application file for complete search history.

(56) References Cited

U.S. PATENT DOCUMENTS

| | | | |
|---|---|---|---|
| 8,527,673 B2 * | 9/2013 | Mahalingam | G06F 9/45558 711/6 |
| 9,846,610 B2 * | 12/2017 | Tsirkin | G06F 12/00 |
| 2021/0263760 A1 * | 8/2021 | Tsirkin | G06F 9/45558 |

* cited by examiner

*Primary Examiner* — Idriss N Alrobaye
*Assistant Examiner* — Richard B Franklin

(57) ABSTRACT

Techniques for enabling efficient guest OS access to PCIe configuration space are provided. In one set of embodiments, a hypervisor can reserve a single host physical memory page in the host physical memory of a host system and can populate the single host physical memory page with a value indicating non-presence of PCIe device functions. The hypervisor can then create, for each guest physical memory page in a guest physical memory of a virtual machine (VM) corresponding to a PCIe configuration space of an absent PCIe device function in the VM, a mapping in the hypervisor's second-level page tables that maps the guest physical memory page to the single host physical memory page.

18 Claims, 4 Drawing Sheets

ENABLING EFFICIENT GUEST ACCESS TO PERIPHERAL COMPONENT INTERCONNECT EXPRESS (PCIE) CONFIGURATION SPACE

BACKGROUND

Unless otherwise indicated, the subject matter described in this section is not prior art to the claims of the present application and is not admitted as being prior art by inclusion in this section.

Peripheral Component Interconnect Express (PCIe) is a computer interface specification that enables high-speed peripheral devices to connect and communicate with computer systems in a standardized manner. A peripheral device that adheres to the PCIe specification, referred to as a PCIe device, attaches to a PCIe bus of a computer system and includes one or more functions representing the features/capabilities implemented by the device. Examples of such functions include a graphics controller function, a storage controller function, a network interface function, and so on. Each function is associated with a set of internal device registers, collectively referred to as a configuration space, that contains various informational and configuration parameters for the function. These configuration spaces are made accessible to device drivers and other software components for device initialization and setup purposes.

In modern computer systems based on 64-bit x86 and ARM microprocessor architectures, the specific mechanism by which the configuration spaces of PCIe device functions are exposed to software is known as Enhanced Configuration Access Mechanism (ECAM). ECAM involves mapping the configuration spaces on a per-segment—or in other words, per-bus—basis to regions in main memory. With these mappings in place, at the time a device driver or other program wishes to access the configuration space of a function number F belonging to a PCIe device number D on a bus number B, the device driver can compute the main memory address where the configuration space is mapped by retrieving the starting (i.e., base) address of B's memory-mapped region and adding to that base address an ECAM offset derived from B, D, and F. The device driver can then read or write the configuration space of F using this computed address.

When a computer system is virtualized (i.e., run as a virtual machine (VM)), all ECAM accesses to the configuration spaces of the VM's virtual and passthrough PCIe devices are emulated at the hypervisor level. This is achieved by ensuring that the range of guest physical memory reserved for mapping the devices' configuration spaces via ECAM is not backed by host physical memory, which in turn causes the hypervisor to trap and emulate guest reads or writes directed to that range. While this approach is functional, there are two issues: (1) the trap-and-emulate required for each ECAM access is relatively slow, and (2) the VM's guest operating system (OS) typically must perform a large number of ECAM accesses at the time of VM startup/boot in order to scan for the presence/non-presence of PCIe devices and to configure the function(s) of each present PCIe device. Taken together these issues result in a lengthy VM boot process, which is problematic for deployments that rely on fast VM boot times to meet technical or business goals.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to techniques that enable the guest OS (and/or other guest software/firmware) of a VM to efficiently access the configuration spaces of the VM's PCIe device functions using ECAM. In one set of embodiments, the hypervisor on which the VM runs can reserve a single host physical memory page P, fill page P with a value indicating the absence—or in other words, "non-presence"—of a PCIe device function (e.g., the hexadecimal value 0xFF), and map page P in the hypervisor's second-level page tables to ECAM addresses in guest physical memory that correspond to the configuration spaces of PCIe device functions that are absent in the VM. Upon completion of these steps, when the guest OS performs a PCIe bus scan at VM boot, the ECAM accesses performed by the guest OS with respect to the absent PCIe device functions will not cause traps into the hypervisor; instead, they will cause the guest OS to directly retrieve the contents of host physical memory page P comprising the non-presence value 0xFF, resulting in a significant reduction in VM boot time.

In another set of embodiments, for each present PCIe device function $F_i$ in the VM, the hypervisor can reserve a host physical memory page $P_i$, map page $P_i$ in its second-level page tables to the function's ECAM address, and populate page $P_i$ with the configuration space information for $F_i$, including one or more entries identifying fixed hardware resources (e.g., main memory address ranges) assigned by the hypervisor to function $F_i$ via the PCIe Enhanced Allocation (EA) feature. The results of these steps are twofold: first, when the guest OS performs ECAM accesses to read the configuration space of $F_i$, those ECAM accesses will not cause traps into the hypervisor; instead, they will cause the guest OS to directly retrieve the contents of corresponding host physical memory page $P_i$; and second, because page $P_i$ includes EA entries specifying the fixed hardware resources that may be used by function $F_i$, the guest OS will not attempt configure the Base Address Registers (BARs) in the configuration space of $F_i$ (which would require trapping and emulation by the hypervisor), leading to further reductions in VM boot time.

The foregoing and other aspects of the present disclosure are described in further detail in the sections that follow.

2. Example Host System

Figure 1:
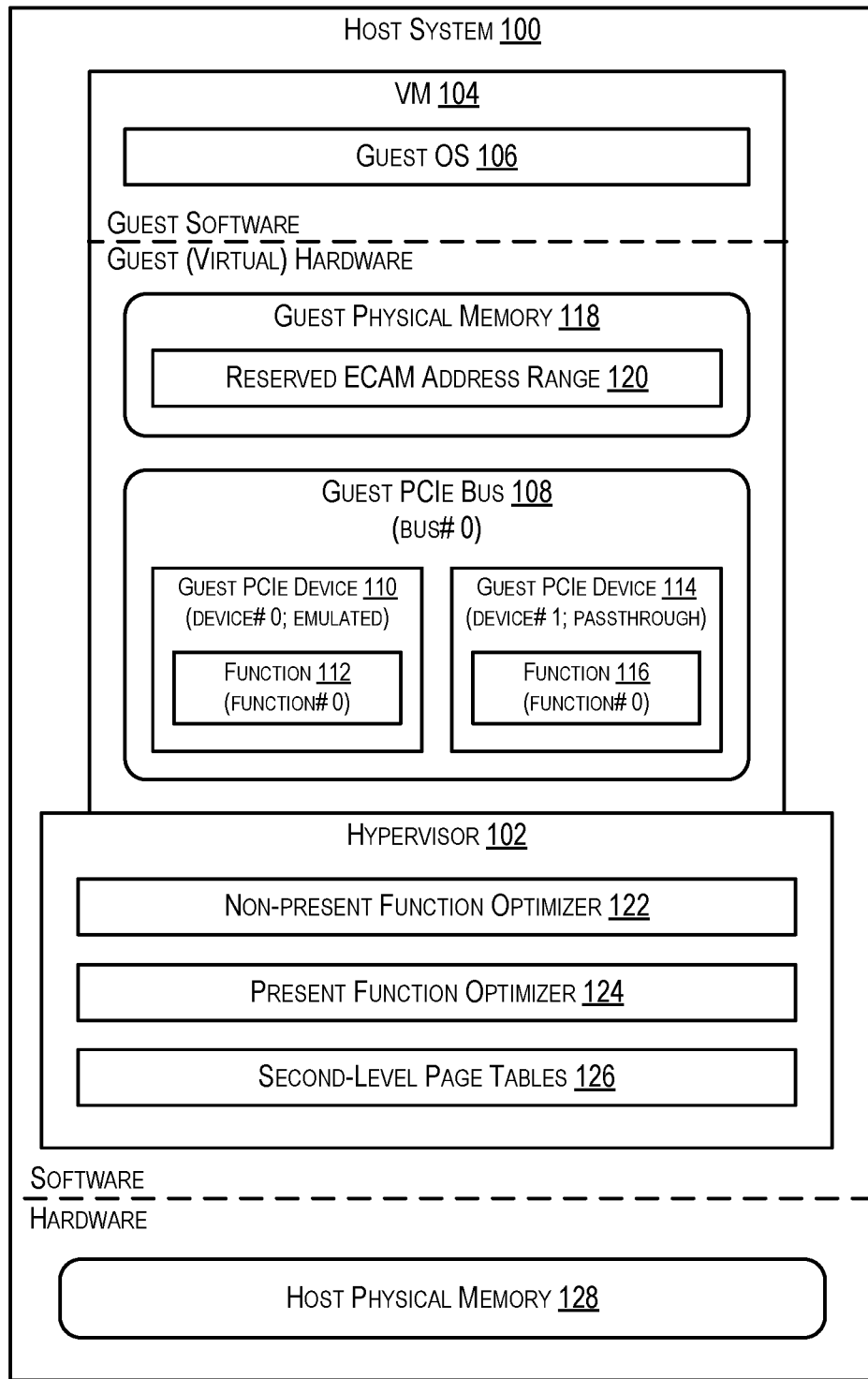
FIG. 1 depicts an example host system according to certain embodiments.

FIG. 1 depicts an example host system 100 comprising a hypervisor 102 that implements the techniques of the present disclosure. As shown, hypervisor 102 provides a runtime environment for a VM 104 that includes a guest OS 106, a guest physical memory 118, and a guest PCIe bus 108 ("bus #0"). Guest PCIe bus 108 includes a first guest PCIe device 110 ("device #0") comprising a function 112 ("function #0" of device #0) and a second guest PCIe device 114 ("device #1") comprising another function 116 ("function #0" of device #1). In this example, guest PCIe device 110 is an emulated device that corresponds to a virtual PCIe device managed by hypervisor 102 and guest PCIe device 114 is a "passthrough" device that corresponds to a physical PCIe device of host system 100. Generally speaking, a passthrough device is a real device that is exclusively accessed by a single VM (and thus is not multiplexed among multiple VMs by hypervisor 102). Although exactly one guest PCIe bus and two guest PCIe devices are depicted in VM 104 for purposes of illustration, any number of these entities (up to the PCIe specification limits), as well as any permutation of virtual and passthrough devices, may be present in alternative embodiments.

It is assumed that VM 104 employs ECAM to expose the configuration spaces of functions 112 and 116 to guest OS 106 and other guest software components, which means that (a) these configuration spaces are mapped to a region designated for bus 108 within a reserved address range (i.e., ECAM address range) 120 of guest physical memory 118 and (b) guest software can access the configuration space for a given function via a guest physical memory address (i.e., ECAM address) which is computed using the base address of the memory-mapped region and an ECAM offset derived from the bus number, device number, and function number. For example, guest OS 106 can access the configuration space for function 116 via an ECAM address that is computed using the base address of the memory-mapped region for guest PCIe bus 108 and an ECAM offset derived from bus number 0, device number 1, and function number 0. Per the PCIe specification, the size of the configuration space for a single function is 4 KB (kilobytes), a device may implement up to 8 functions (with at least function number 0 being required), and a bus may include up to 32 devices, resulting in a total allocation of 1 MB (megabyte) for the memory-mapped region of each bus/segment.

In addition, it is assumed that guest OS 106 executes a bus scan—or in other words, "bus enumeration"—at bootup of VM 104 that involves traversing through the bus hierarchies (i.e., bus/device/function trees) of the guest PCIe buses within VM 104. One purpose of this bus scan is to determine, for each guest PCIe bus, which guest PCIe device numbers and function numbers—out of the possible 32 devices and 8 functions per device—are present (i.e., attached) or absent (i.e., not attached) on that bus. Another purpose of the bus scan is to determine the status and access parameters of each function that is identified as being present (by, e.g., reading a command register in the function's configuration space) and to configure the function's Base Access Registers (BARs). This BAR configuration process/protocol generally comprises reading, by the guest OS, an initial value from each BAR that indicates the scope of system hardware resources (e.g., amount of main memory) needed by the function to carry out its tasks/ operations. The guest OS then allocates the requested system hardware resources and writes a new value to the BAR that indicates to the function where the allocated resources can be accessed/found.

Figure 2:
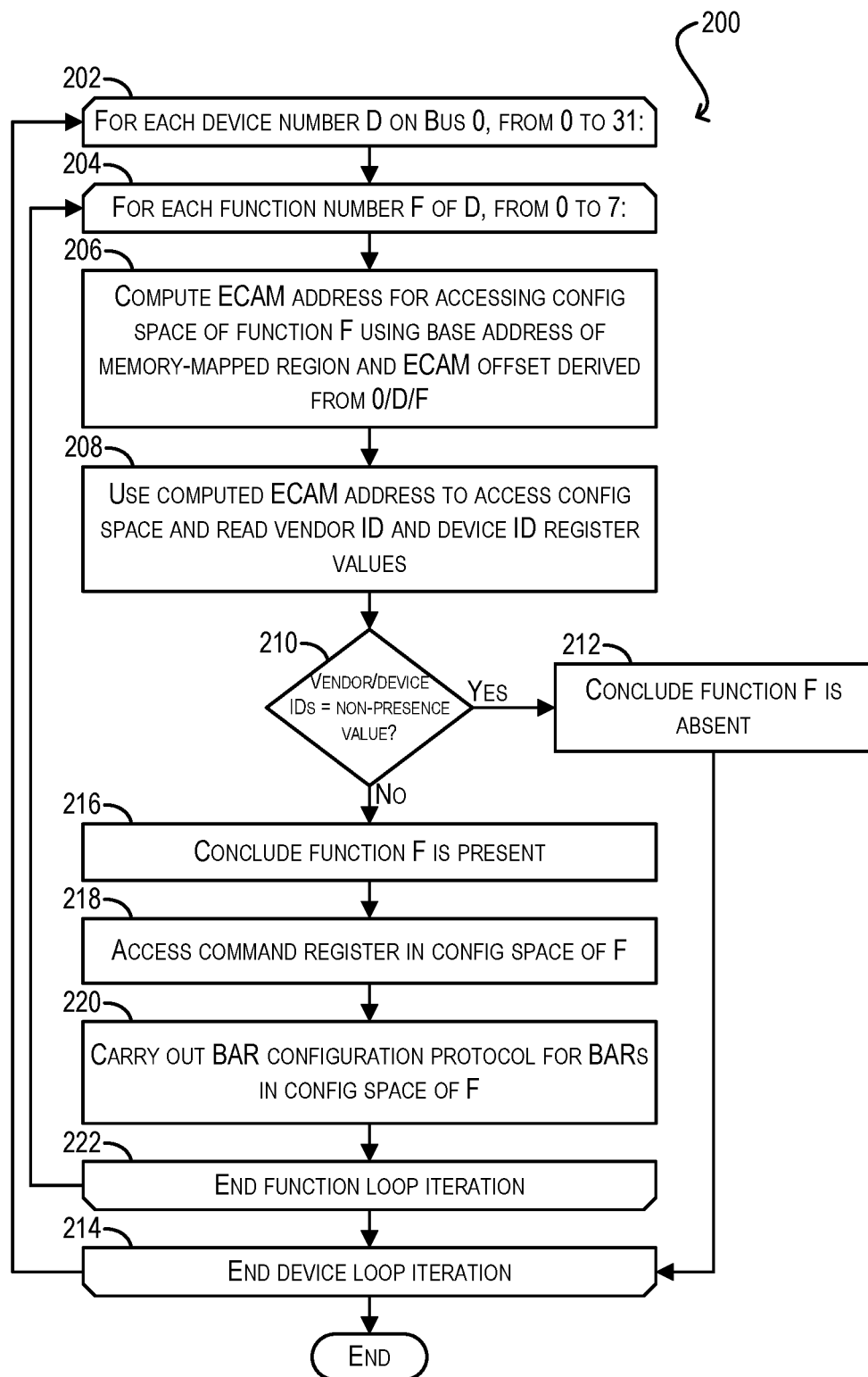
FIG. 2 depicts an example PCIe bus scan workflow according to certain embodiments.

By way of example, FIG. 2 depicts a workflow 200 that may be executed by guest OS 106 for performing a bus scan of guest PCIe bus 108 according to certain embodiments. Starting with block 202, guest OS 106 can enter a first loop for each possible device number D, from 0 to 31, on bus 108 (i.e., bus #0). Within the first loop, guest OS 106 can enter a second loop for each possible function number F, from 0 to 7, that is part of device D (block 204).

Within the second loop, guest OS 106 can compute the ECAM address for accessing the configuration space of function F using the base address of the memory-mapped region for bus 108 and an ECAM offset derived from 0/D/F (block 206). Guest OS 106 can then access, from guest physical memory 118 of VM 104, the configuration space for function F via the computed ECAM address and read the values of the vendor ID and device ID registers in the configuration space (block 208).

At block 210, guest OS 106 can check whether the vendor ID and device ID values equal a predetermined non-presence value (e.g., 0xFF). If the answer is yes, guest OS 106 can conclude that function F is absent/not present (i.e., not attached) on bus 108 (block 212) and proceed to the end of the current iteration of the device loop (block 214). If F equals 0, guest OS 106 can also conclude that parent device D is absent/not present on bus 108.

However, if the answer at block 210 is no, guest OS 106 can conclude that function F and its parent device D are present (i.e., attached) on bus 108 (block 216). In response, guest OS 106 can access the command register in the configuration space of function F to determine the status and features of function F (block 218), carry out the BAR configuration process/protocol noted above with respect to the BARs in the configuration space of function F (block 220), and reach the end of the current iteration of the function loop (block 222). Upon completion of both loops workflow 200 can end.

As mentioned in the Background section, in existing hypervisors all ECAM accesses made by a guest OS to the configuration spaces of guest PCIe devices (whether virtual or passthrough) are trapped and emulated at the hypervisor level. In particular, at the time of constructing their second-level page tables (which hold guest physical page to host physical page mappings), existing hypervisors do not map the reserved ECAM address ranges of their VMs to any host physical memory; instead they leave those ECAM address ranges unmapped, resulting in corresponding "gaps" in the second-level page table mappings. Because of this, when a guest OS attempts to access the configuration space of a PCIe device function F via the function's computed ECAM address, a page fault is triggered and the ECAM access is trapped by the hypervisor. The hypervisor then determines that the access is directed to F's configuration space, takes appropriate steps to fulfill the access against virtual/emulated state maintained for F, and returns control to the guest OS.

The foregoing is problematic because (1) the trap-and-emulate process is much slower than a direct, unemulated access path, due to the context switching and processing steps involved, and (2) as discussed with respect to FIG. 2, a PCI bus scan is performed at the time of VM boot that requires a large number of ECAM accesses to identify which guest PCIe devices/functions are present or absent on the VM's buses and to configure the present functions. Collectively, (1) and (2) mean that the amount of time needed to complete the bus scan is quite high, which in turn translates into long VM boot times.

To address these and other similar issues, hypervisor 102 of FIG. 1 implements two novel components in accordance with embodiments of the present disclosure: a "non-present function optimizer" component 122 and a "present function optimizer" component 124. These components leverage the fact that the size of the configuration space for a PCIe device function (i.e., 4 KB) is identical to the size of a physical memory page in, e.g., the x86 and ARM microprocessor architectures.

As detailed in section (3) below, non-present function optimizer 122 enables hypervisor 102 to create, in the hypervisor's second-level page tables 126, mappings between a single page P in a host physical memory 128 and ECAM addresses in reserved ECAM address range 120 corresponding to the configuration spaces of absent (i.e., non-present) guest PCIe device functions in VM 104. Host physical memory page P is set as read-only and is filled with a non-presence value as defined under the PCIe specification (e.g., 0xFF). The end result of this process is that when guest OS 106 performs its bus scan at VM boot, all ECAM accesses made by guest OS 106 to the configuration spaces of absent functions will retrieve page P (in accordance with the mappings added to second-level page tables 126) and thus guest OS 106 will conclude that those functions are not present, without causing time-consuming traps into hypervisor 102.

Further, as detailed in section (4) below, present function optimizer 124 enables hypervisor 102 to assign one or more fixed hardware resources (e.g., main memory address ranges) to each guest PCIe function $F_i$ present in VM 104 via Enhanced Allocation (EA). EA is a functionality supported by certain PCIe devices and OSs that allows the PCIe hardware to specify such fixed resources (rather than relying on the OS to assign resources to functions via BAR configuration protocol). Upon assigning the fixed hardware resources, hypervisor 102 can create, in second-level page tables 126 for each present function $F_i$, a mapping between a page $P_i$ in host physical memory 128 and the ECAM address corresponding to the configuration space of F. Page $P_i$ is set as read-only and is populated with the configuration space information for $F_i$, including one or more EA entries identifying the fixed hardware resources assigned to $F_i$ by hypervisor 102. The end result of this process is that when guest OS 106 performs ECAM accesses to read the configuration space of function $F_i$ at the time of initializing $F_i$, those ECAM accesses will retrieve page $P_i$ in accordance with the mapping added to second-level page tables 126, without causing a time-consuming trap into hypervisor 102. In addition, guest OS 106 will not attempt to configure the BARs of function $F_i$, thereby avoiding the need for hypervisor 102 to trap and emulate the guest write(s) made as part of the BAR configuration protocol.

It should be appreciated that the host system architecture shown in FIG. 1 is illustrative and not intended to limit embodiments of the present disclosure. For example, although FIG. 2 depicts a particular arrangement of entities and components within host system 100, other arrangements are possible (e.g., the functionality attributed to a particular entity/component may be split into multiple entities/components, entities/components may be combined, etc.). Further, the various entities/components shown may include sub-components and/or functions that are not specifically described. One of ordinary skill in the art will recognize other variations, modifications, and alternatives.

3. Optimization Workflow for Absent Functions

Figure 3:
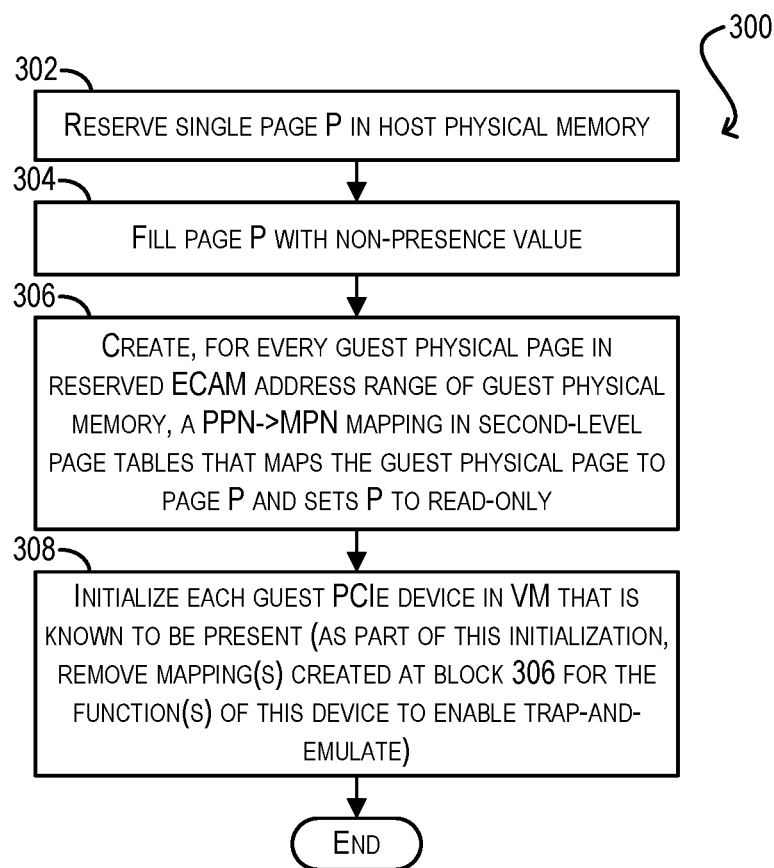
FIG. 3 depicts a workflow for optimizing guest OS access to the configuration spaces of absent PCIe device functions according to certain embodiments.

FIG. 3 depicts a workflow 300 that provides additional details regarding the steps that may be performed by hypervisor 102 (per its non-present function optimizer 122) to optimize guest OS access to the configuration spaces of absent PCIe devices/functions in VM 104 according to certain embodiments. Hypervisor 102 may execute workflow 300 at the time of setting up second-level page tables 126 (sometimes referred to as "extended page tables" (EPT) or "nested page tables" (NPT)), which as mentioned previously comprise mappings between the guest physical memory pages of the hypervisor's VMs (identified via Physical Page Numbers or PPNs) and the host physical memory pages of host system 100 (identified via Machine Page Numbers or MPNs).

Starting with blocks 302 and 304, hypervisor 102 can reserve a single host physical memory page P in host physical memory (i.e., main memory) 128 of host system 100 and can fill page P with a value that indicates, under the PCIe specification, the absence/non-presence of a PCIe device function. For example, if the value is 0xFF and the size of the reserved host physical memory page is 4 KB, hypervisor 102 can fill the entirety of the 4 KB page with this value in a repeating fashion, such that 0xFF appears at every 8-bit offset.

At block 306, hypervisor 102 can create, for every guest physical memory page in reserved ECAM address range 120 of guest physical memory 118, a PPN-to-MPN mapping in second-level page tables 126 that maps that guest physical memory page to the host physical memory page P reserved at block 302. For each of these page table mappings, hypervisor 102 can set page P as read-only (so that the guest software within VM 104 cannot modify it) and as un-cached.

Finally, at block 308, hypervisor 102 can initialize each guest PCIe device in VM 104 that hypervisor 102 knows is present in the VM (e.g., guest PCIe devices 110 and 114 in FIG. 1). In certain embodiments, as part of this step hypervisor 102 can remove, for each function of each present guest PCIe device, the page table mapping created at block 306 between the guest physical memory page addressed by the ECAM address of that function and host physical memory page P. In this way, hypervisor 102 can ensure that ECAM accesses to the configuration spaces of these present device functions will result in a trap-and-emulate by hypervisor 102 as needed.

It should be appreciated that workflow 300 is illustrative and various modifications are possible. For example, this workflow essentially maps the entirety of reserved ECAM address range 120 of VM 104 to host physical memory page P (comprising the non-presence value 0xFF) in second-level page tables 126 and then selectively removes the mappings for present device functions at the time of device initialization (thereby causing the mappings for absent device functions to remain in place). In alternative embodiments, hypervisor 102 can traverse through the bus hierarchies of the guest PCIe buses in VM 104 and explicitly identify all absent device numbers/function numbers. Hypervisor 102 can then create the page table mappings noted with respect to block 306 for the ECAM addresses of the absent functions only.

4. Optimization Workflow for Present Functions

Figure 4:
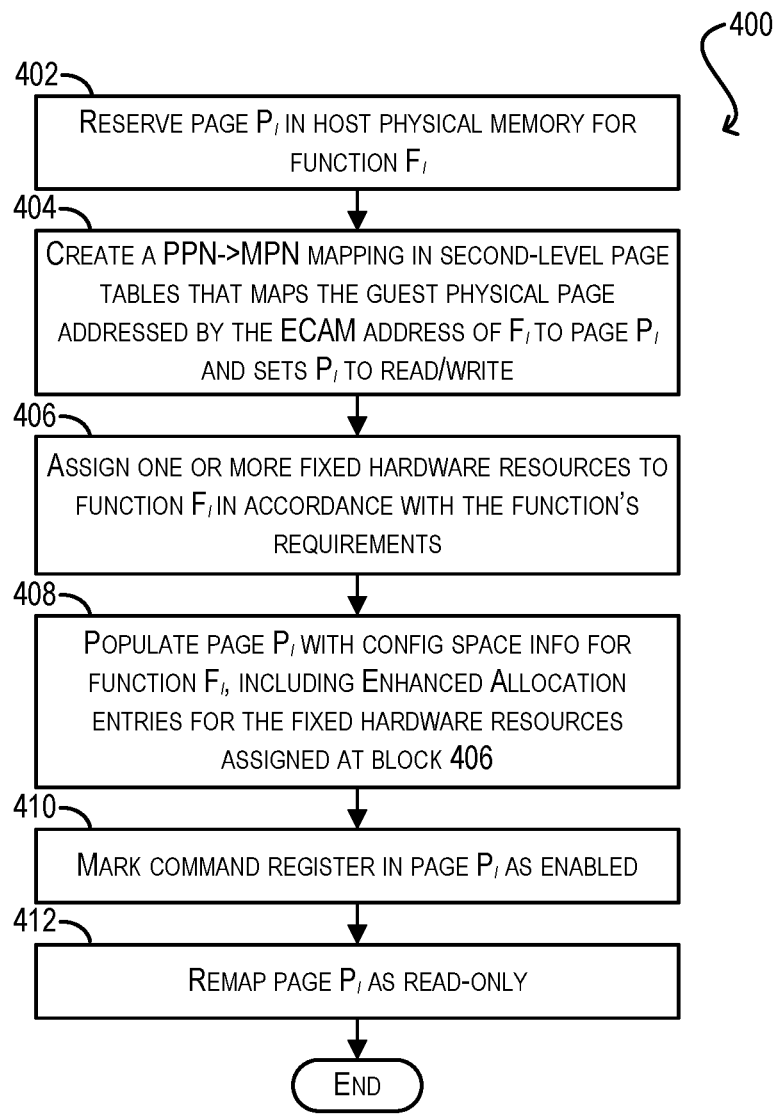
FIG. 4 depicts a workflow for optimizing guest OS access to the configuration spaces of present PCIe device functions according to certain embodiments.

FIG. 4 depicts a workflow 400 that provides additional details regarding the steps that may be performed by hypervisor 102 (per its present function optimizer 124) to optimize guest OS access to the configuration spaces of present PCIe devices/functions in VM 104 according to certain embodiments. In particular, workflow 400 illustrates steps that may be performed with respect to each present PCIe device function $F_i$ of VM 104 at the time of initializing its parent device. This parent device may be an emulated PCIe device (such as device 110 of FIG. 1) or a passthrough PCIe device (such as device 114 of FIG. 1).

In some embodiments, hypervisor 102 may implement workflow 400 without implementing workflow 300 of FIG. 3. In other embodiments, hypervisor 102 may implement workflow 400 in conjunction with workflow 300. In the latter case, hypervisor 102 may execute workflow 400 as part of the device initialization noted at block 308 of workflow 300.

Starting with blocks 402 and 404, hypervisor 102 can reserve a host physical memory page $P_i$ in host physical memory 128 of host system 100 for function $F_i$ and can create a PPN-to-MPN mapping in second-level page tables 126 that maps the guest physical memory page addressed by the ECAM address of $F_i$ (i.e., the guest physical memory page mapped to the configuration space for $F_i$) to page $P_i$. This mapping can specify that page $P_i$ can be both read and written.

At block 406, hypervisor 102 can assign one or more fixed hardware resources to function $F_i$ in accordance with the function's requirements. These fixed hardware resources can include, e.g., a particular memory address range in host physical memory 128 that is reserved for use by F. Hypervisor 102 can then populate page $P_i$ with configuration space information (i.e., configuration space register values) for $F_i$, including EA entries for the fixed hardware resources assigned at block 406 (block 408). In one set of embodiments, each EA entry can include a BAR equivalent indicator (BEI) indicating the Base Address Register of function $F_i$ that the entry corresponds to and a descriptor of the assigned resource. For example, in the case where hypervisor assigns a range of host physical memory 128, the descriptor can identify the base memory address of this range and max offset.

At block 410, hypervisor 102 can mark the PCIe command register for function $F_i$ within page $P_i$ as being enabled, which indicates the $F_i$ is powered-on and ready for operation.

Finally, hypervisor 102 can re-map page $P_i$ (or modify the existing mapping created at block 404) in second-level page tables 126 such that $P_i$ is set as read-only (block 412). As mentioned previously, with this mapping in place guest OS 106 will be able to access the configuration space of function $F_i$ without causing a trap into the hypervisor and will skip configuration of the function's BARs.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
reserving, by a hypervisor of a host system, a single host physical memory page in a host physical memory of the host system;
populating, by the hypervisor, the single host physical memory page with a value indicating non-presence of PCIe (Peripheral Component Interconnect Express) device functions; and
creating, by the hypervisor for each guest physical memory page in a guest physical memory of a virtual machine (VM) corresponding to a PCIe configuration space of an absent PCIe device function in the VM, a mapping in second-level page tables of the hypervisor that maps the guest physical memory page to the single host physical memory page, the creating comprising:
  creating, for all guest physical memory pages in a reserved ECAM (Enhanced Configuration Allocation Mechanism) address range of the VM, mappings in the second-level page tables between the guest physical memory pages and the single host physical memory page; and
  initializing each PCIe device function present in the VM, the initializing including removing, from the second-level page tables, a mapping between a guest physical memory page corresponding to a PCIe configuration space of said each PCIe device function and the single host physical memory page.

2. The method of claim 1 wherein the mapping sets the single host physical memory page as read-only.

3. The method of claim 1 wherein the value is 0xFF.

4. The method of claim 1 further comprising, for each present PCIe device function in the VM:
  reserving, in the host physical memory, another host physical memory page for the present PCIe device function; and
  creating, in the second-level page tables, another mapping between a guest physical memory page addressed by an ECAM address of the present PCIe device function and said another host physical memory page, wherein said another mapping sets said another host physical memory page as writable.

5. The method of claim 4 further comprising:
  assigning one or more hardware resources of the host system to the present PCIe device function;
  populating said another host physical memory page with PCIe configuration space register values for the present PCIe device function, the PCIe configuration space register values including one or more values identifying the one or more hardware resources; and
  modifying said another mapping to set said another host physical memory page as read-only.

6. The method of claim 4 wherein there are a plurality of present PCIe device functions in the VM, and wherein the plurality of present PCIe device functions include an emulated PCIe device function and a passthrough PCIe device function.

7. A non-transitory computer readable storage medium having stored thereon program code executable by a hypervisor of a host system, the program code causing the hypervisor to execute a method comprising:
  reserving a single host physical memory page in a host physical memory of the host system;
  populating the single host physical memory page with a value indicating non-presence of PCIe (Peripheral Component Interconnect Express) device functions; and
  creating, for each guest physical memory page in a guest physical memory of a virtual machine (VM) corresponding to a PCIe configuration space of an absent PCIe device function in the VM, a mapping in second-level page tables of the hypervisor that maps the guest physical memory page to the single host physical memory page, the creating comprising:
    creating, for all guest physical memory pages in a reserved ECAM (Enhanced Configuration Allocation Mechanism) address range of the VM, mappings in the second-level page tables between the guest physical memory pages and the single host physical memory page; and
    initializing each PCIe device function present in the VM, the initializing including removing, from the second-level page tables, a mapping between a guest physical memory page corresponding to a PCIe configuration space of said each PCIe device function and the single host physical memory page.

8. The non-transitory computer readable storage medium of claim 7 wherein the mapping sets the single host physical memory page as read-only.

9. The non-transitory computer readable storage medium of claim 7 wherein the value is 0xFF.

10. The non-transitory computer readable storage medium of claim 7 wherein the method further comprises, for each present PCIe device function in the VM:
  reserving, in the host physical memory, another host physical memory page for the present PCIe device function; and
  creating, in the second-level page tables, another mapping between a guest physical memory page addressed by an ECAM address of the present PCIe device function and said another host physical memory page, wherein said another mapping sets said another host physical memory page as writable.

11. The non-transitory computer readable storage medium of claim 10 wherein the method further comprises:
  assigning one or more hardware resources of the host system to the present PCIe device function;
  populating said another host physical memory page with PCIe configuration space register values for the present PCIe device function, the PCIe configuration space register values including one or more values identifying the one or more hardware resources; and
  modifying said another mapping to set said another host physical memory page as read-only.

12. The non-transitory computer readable storage medium of claim 10 wherein there are a plurality of present PCIe device functions in the VM, and wherein the plurality of present PCIe device functions include an emulated PCIe device function and a passthrough PCIe device function.

13. A host system comprising:
  a host physical memory;
  a processor; and
  a non-transitory computer readable medium having stored thereon program code for a hypervisor that, when executed by the processor, causes the hypervisor to:
  reserve a single host physical memory page in the host physical memory;
  populate the single host physical memory page with a value indicating non-presence of PCIe (Peripheral Component Interconnect Express) device functions; and
  create, for each guest physical memory page in a guest physical memory of a virtual machine (VM) corresponding to a PCIe configuration space of an absent PCIe device function in the VM, a mapping in second-level page tables of the hypervisor that maps the guest physical memory page to the single host physical memory page, the creating comprising:
    creating, for all guest physical memory pages in a reserved ECAM (Enhanced Configuration Allocation Mechanism) address range of the VM, mappings in the second-level page tables between the guest physical memory pages and the single host physical memory page; and
    initializing each PCIe device function present in the VM, the initializing including removing, from the second-level page tables, a mapping between a guest physical memory page corresponding to a PCIe configuration space of said each PCIe device function and the single host physical memory page.

14. The host system of claim 13 wherein the mapping sets the single host physical memory page as read-only.

15. The host system of claim 13 wherein the value is 0xFF.

16. The host system of claim 13 wherein the program code further causes the hypervisor to, for each present PCIe device function in the VM:
   reserve, in the host physical memory, another host physical memory page for the present PCIe device function; and
   create, in the second-level page tables, another mapping between a guest physical memory page addressed by an ECAM address of the present PCIe device function and said another host physical memory page, wherein said another mapping sets said another host physical memory page as writable.

17. The host system of claim 16 wherein the program code further causes the hypervisor to:
   assign one or more hardware resources of the host system to the present PCIe device function;
   populate said another host physical memory page with PCIe configuration space register values for the present PCIe device function, the PCIe configuration space register values including one or more values identifying the one or more hardware resources; and
   modify said another mapping to set said another host physical memory page as read-only.

18. The host system of claim 16 wherein there are a plurality of present PCIe device functions in the VM, and wherein the plurality of present PCIe device functions include an emulated PCIe device function and a passthrough PCIe device function.

* * * * *